United States Patent
Fidan et al.

(10) Patent No.: US 9,308,703 B2
(45) Date of Patent: Apr. 12, 2016

(54) DEVICE FOR MAKING CORRUGATED METALLIC FOIL TAPE

(71) Applicant: Shurtape Technologies, LLC, Hickory, NC (US)

(72) Inventors: Muzaffer Fidan, Hickory, NC (US); George Stamatoukos, Hickory, NC (US); Pete Elafros, Hickory, NC (US)

(73) Assignee: Shurtape Technologies, LLC, Hickory, NC (US)

( * ) Notice: Subject to any disclaimer, the term of this patent is extended or adjusted under 35 U.S.C. 154(b) by 92 days.

(21) Appl. No.: 13/797,210

(22) Filed: Mar. 12, 2013

(65) Prior Publication Data

US 2014/0150511 A1     Jun. 5, 2014

Related U.S. Application Data

(60) Continuation-in-part of application No. 13/796,456, filed on Mar. 12, 2013, now Pat. No. 8,747,595, which is a division of application No. 13/406,575, filed on Feb. 28, 2012, now Pat. No. 8,894,790, which is a division of application No. 12/290,842, filed on Nov. 4, 2008, now abandoned.

(51) Int. Cl.
| | | |
|---|---|---|
| C09J 7/04 | (2006.01) | |
| B31F 1/26 | (2006.01) | |
| B31F 1/20 | (2006.01) | |
| C09J 7/02 | (2006.01) | |

(52) U.S. Cl.
CPC ... *B31F 1/20* (2013.01); *B31F 1/26* (2013.01); *C09J 7/0292* (2013.01); *C09J 2421/00* (2013.01); *C09J 2431/00* (2013.01); *C09J 2433/00* (2013.01); *C09J 2475/00* (2013.01); *C09J 2483/00* (2013.01)

(58) Field of Classification Search
None
See application file for complete search history.

(56) References Cited

U.S. PATENT DOCUMENTS

| | | | |
|---|---|---|---|
| 2,001,862 A | | 5/1935 | Battey |
| 3,004,880 A | * | 10/1961 | Lord ............................... 156/64 |
| 3,025,963 A | * | 3/1962 | Bauer ........................ 210/493.4 |
| 3,054,439 A | | 9/1962 | Hallam |
| 3,112,184 A | * | 11/1963 | Hollenbach ................ 156/89.22 |
| 3,998,115 A | * | 12/1976 | Cornell ............................. 83/56 |
| 4,174,237 A | * | 11/1979 | Hemming et al. .............. 156/64 |
| 4,248,926 A | | 2/1981 | Tajima et al. |
| 4,319,473 A | | 3/1982 | Franke et al. |
| 4,478,670 A | | 10/1984 | Heyse et al. |

(Continued)

FOREIGN PATENT DOCUMENTS

JP     2001291436 A     10/2001

OTHER PUBLICATIONS http://www.amazon.com/Fiskars-12-93408897-Paper-Crimper/dp/B000FPU3ES/ref=sr_1_1?s=arts-crafts&ie=UTF8&qid=1420657077&sr=1-1&keywords=fiskars+crimper; 2010.*

(Continued)

*Primary Examiner* — Barbara J Musser
(74) *Attorney, Agent, or Firm* — Nelson Mullins Riley & Scarborough LLP

(57) ABSTRACT

A corrugator system for corrugating metallic foil tape. The corrugated metallic foil tape made by the system is suitable to be applied to contoured or three-dimensional surfaces, and is particularly suitable for use in sealing or joining components of heat, ventilation, and air conditioning (HVAC) units.

7 Claims, 13 Drawing Sheets

(56) References Cited

U.S. PATENT DOCUMENTS

| | | | |
|---|---|---|---|
| 4,620,729 | A | 11/1986 | Kauffman |
| 4,906,108 | A | 3/1990 | Herrington et al. |
| 5,188,883 | A | 2/1993 | Rawlyk |
| 5,246,762 | A | 9/1993 | Nakamura |
| 5,384,174 | A | 1/1995 | Ward et al. |
| 5,393,106 | A | 2/1995 | Schroeder |
| 5,564,756 | A | 10/1996 | Hamilton |
| 6,244,633 | B1 | 6/2001 | Warren |
| 6,280,856 | B1 | 8/2001 | Anderson et al. |
| 6,902,784 | B2 | 6/2005 | Princell et al. |
| 6,953,512 | B2 | 10/2005 | Cohen et al. |
| 7,329,448 | B2 | 2/2008 | Cunningham |
| 7,351,472 | B2 | 4/2008 | Ishikawa et al. |
| 2002/0113485 | A1 | 8/2002 | Ketter et al. |
| 2003/0145953 | A1* | 8/2003 | Chen .................... 156/510 |
| 2003/0228436 | A1 | 12/2003 | Ishimura |
| 2004/0164116 | A1 | 8/2004 | Foubert et al. |
| 2005/0017350 | A1 | 1/2005 | Corti et al. |
| 2006/0083898 | A1 | 4/2006 | Deng et al. |
| 2006/0147667 | A1 | 7/2006 | Salmon |
| 2006/0150549 | A1 | 7/2006 | Webb et al. |
| 2006/0240208 | A1 | 10/2006 | Ishikawa et al. |
| 2006/0240252 | A1 | 10/2006 | Takahashi et al. |
| 2007/0272341 | A1 | 11/2007 | Khan et al. |
| 2008/0011896 | A1* | 1/2008 | Johnston et al. ......... 242/410 |
| 2008/0032082 | A1 | 2/2008 | Scur et al. |
| 2008/0047661 | A1 | 2/2008 | McTaggart |
| 2008/0102240 | A1 | 5/2008 | Serra et al. |
| 2010/0112294 | A1* | 5/2010 | Fidan ..................... 428/163 |
| 2013/0240656 | A1* | 9/2013 | Merz et al. ............. 242/410 |

OTHER PUBLICATIONS

IECC 2003 803.2.8 Duct and Plenum Insulation and Sealing, published by International Code Council., copyright 2003, Paul Rimelspach, Energy Designed Homes (sm) a dba of Rimelspach Ent. Inc. 1690 E. Choctaw Dr., London, OH 43140, pp. 1-6.

ASTM Designation: E 2342-03, "Standard Test Method for Durability Testing of Duct Sealants", copyright ASTM International, 100 Barr Harbor Drive, PO Box C700, West Conshohocken, PA 19428, pp. 1-5, Jul. 31, 2007.

ASTM Designation: D3654-96, "Standard Test Method for Holding Power of Pressure-Sensitive Tapes", ASTM International, 100 Barr Harbor Drive, PO Box C700, West Conshohocken, PA 19428, pp. 437-440, May 1996.

International Search Report PCT/US09/05618.

* cited by examiner

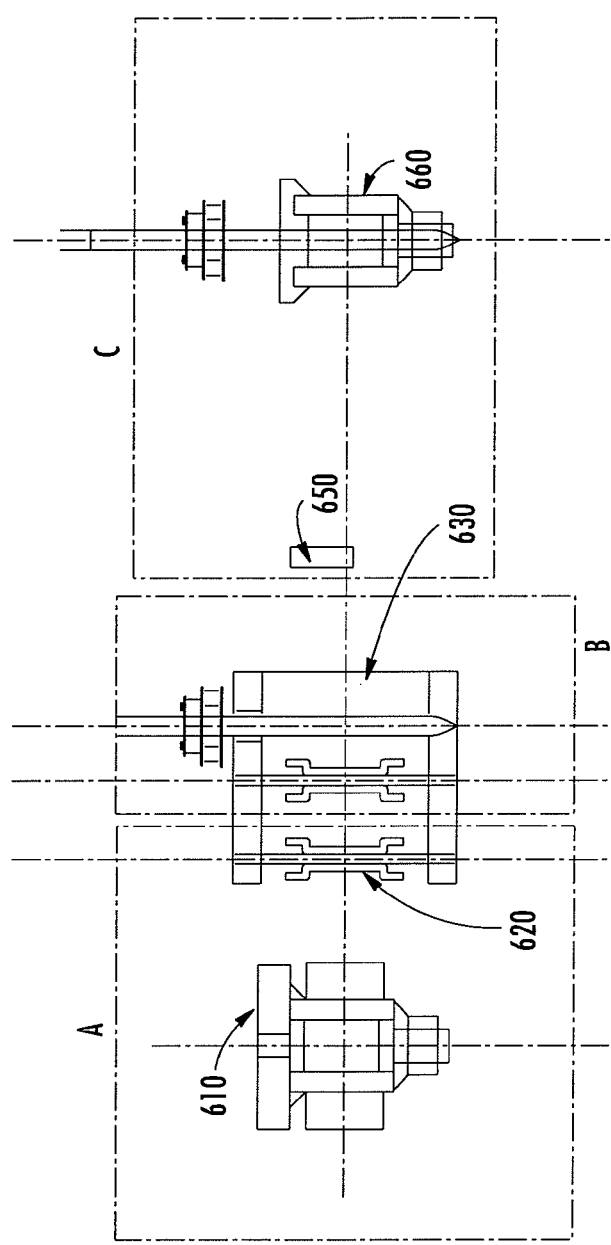
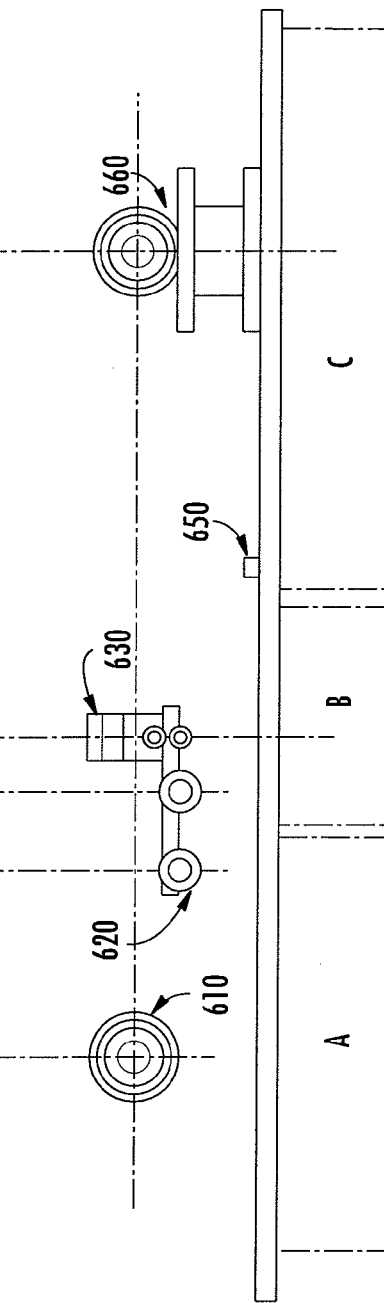

DEVICE FOR MAKING CORRUGATED METALLIC FOIL TAPE

CROSS-REFERENCE TO RELATED APPLICATIONS

This application is a continuation-in-part of and thus is entitled to the benefit of, and claims priority from U.S. Divisional patent application Ser. No. 13/796,456, filed on Mar. 12, 2013, which claims the benefit of U.S. Divisional patent application Ser. No. 13/406,575, filed on Feb. 28, 2012, which claims the benefit of U.S. patent application Ser. No. 12/290, 842, filed on Nov. 4, 2008. The disclosures of which are incorporated herein by reference in their entireties.

FIELD OF THE INVENTION

The present invention relates to a corrugated metallic foil tape for use in heating, ventilation, and air conditioning units, or related applications and a device for making a corrugated metallic foil tape.

BACKGROUND OF THE INVENTION

It is of growing global concern not only to conserve energy but also to mitigate loss of energy. One such example is with loss of energy in residential or commercial buildings.

There are many known approaches in use today to attempt to address this problem of mitigating energy loss. It is known to use sealants, duct mastic and caulking for sealing around the joints of a heating, ventilation and air conditioner (HVAC) unit. Common sealants include butyl, polyurethane and acrylic sealants. In the case of a sealant, the sealant is typically applied by painting the joint or crack around the heating, ventilation, and air conditioning unit, particularly around joints or seams at the plenum, trunk registers or other duct branches. The sealant is subsequently cured after being applied. Among the disadvantages with such sealants and mastics, for example, are that they are often cumbersome and messy to apply and, once applied, are typically not readily removable or adjustable.

There are also known disadvantages associated with duct tape. It is often advised not to use duct tape in HVAC applications. According to the International Energy Conservation Code published by the International Code Council in IECC 2003 803.2.8 for Duct and Plenum Insulation and Sealing: "All joints, longitudinal and transverse seams, and connections in ductwork, shall be securely fastened and sealed with welds, gaskets, mastics (adhesives), mastic-plus-embedded fabric systems, or tapes. Tapes and mastics used to seal ductwork shall be listed and labeled in accordance with UL 181A or UL 181B. Duct connections to flanges of air distribution equipment shall be sealed and mechanically fastened . . . duct tape is not permitted as a sealant on any metal ducts." For example, over time conventional duct tape cracks and results in leaks in the system. This creates problems as the joints or seams in a HVAC unit are often inaccessible after installation.

There are also known disadvantages associated with flat HVAC rated aluminum tapes. Such flat aluminum tapes when applied around a circular vent or air duct, for example, leave gaps through which energy can escape. These tapes are often time consuming to apply to minimize gaps around contoured surfaces. Furthermore, they are not easily pliable around such surfaces and readily tear.

Since most duct leakage occurs at the connection to registers, plenums or branches in the duct system, at each of these connections a method of sealing the duct system is required. Field examination of duct systems have typically shown that these seals tend to fail over extended periods of time. ASTM Test Method E 2342-03, which is the standard test method for "Durability Testing of Duct Sealants," evaluates the durability of duct sealants by blowing heated air into test sections, combined with a pressure difference between the test sections and their surroundings. In the Method E 2342-03, the temperatures and pressures were chosen to expose the test sections to typical conditions that are found in residential duct systems. The duct leakage site geometry represents a leakage site commonly found in duct systems. Therefore, there is a need for a more efficient and reliable method to seal joints, and hence mitigate energy loss, in a HVAC unit, particularly in the plenum, trunk registers or other duct branches of a HVAC unit.

SUMMARY OF THE INVENTION

The present invention relates to a metallic foil tape having a top surface and a bottom surface with an adhesive applied to at least one of the top surface or the bottom surface of the metallic foil tape and corrugations in the metallic foil tape providing for expansion of the corrugated metallic foil tape in a circular or semi-circular shape. The corrugated metallic foil tape is suitable to be applied to contoured or three-dimensional surfaces, and is particularly suitable for use in sealing or joining components of heat, ventilation, and air conditioning (HVAC) units.

The present invention also relates to a method of making the corrugated metallic foil tape and a method of using the same.

The present invention also relates to a device for making the corrugated metallic foil tape.

The corrugated metallic foil tape of the present invention solves the problems associated with energy loss in HVAC units and provides an efficient, clean, and resilient alternative to known tapes and sealants used in such applications.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 11 is a top view of certain of the components in the corrugator system of FIG. 10.

FIG. 12 is a side view of the components of FIG. 11.

DETAILED DESCRIPTION OF THE INVENTION

The following detailed description of the embodiment(s) is merely exemplary in nature and is in no way intended to limit the invention, its application, or uses.

The tape of the present invention is a corrugated metallic tape for sealing joint or seams in a heating, ventilation and air conditioner (HVAC) unit. The joint or seam is typically associated with the plenum, trunk register or other duct branches in the HVAC unit. The tape of the present invention is particularly suited for sealing the HVAC collar to the plenum or to other parts of the HVAC unit where there are contoured, angled, or three-dimensional surfaces to which the tape needs to be applied. A plenum typically refers to a sealed chamber at the inlet or outlet of an air unit to which ductwork is attached.

Figure 1:
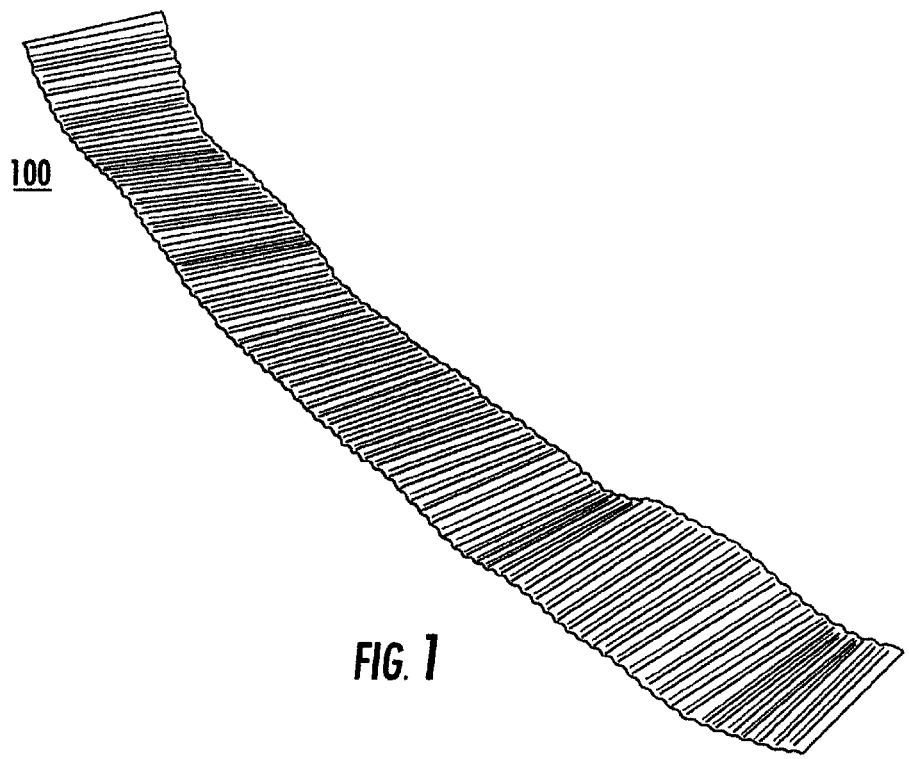
FIG. 1 is an illustrative drawing of a corrugated metallic foil adhesive tape in accordance with the present invention.
Figure 2A:
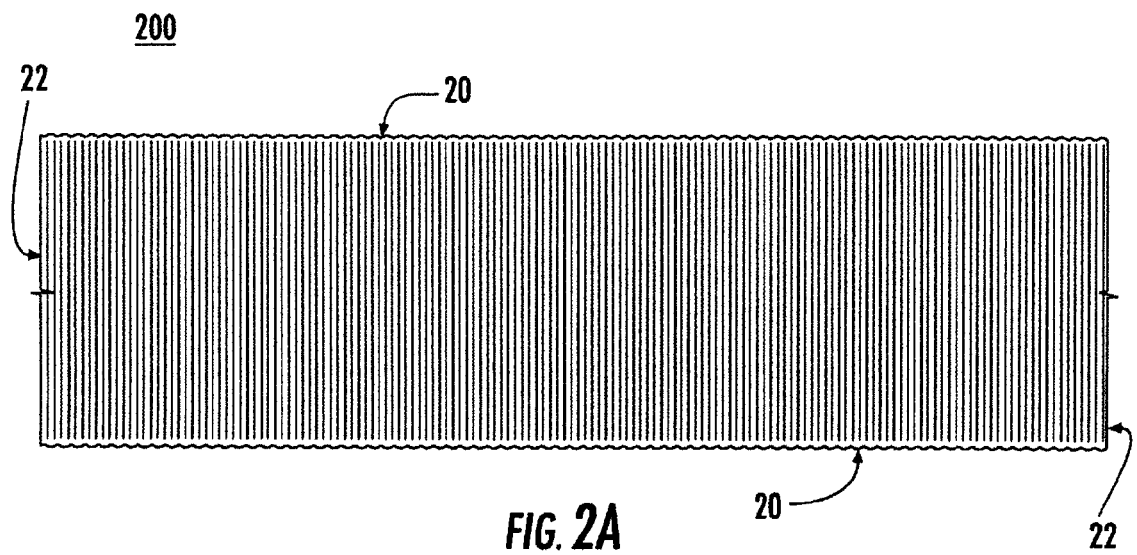
FIG. 2A illustrates corrugations in a corrugated metallic foil adhesive tape in accordance with the present invention.
Figure 2B:
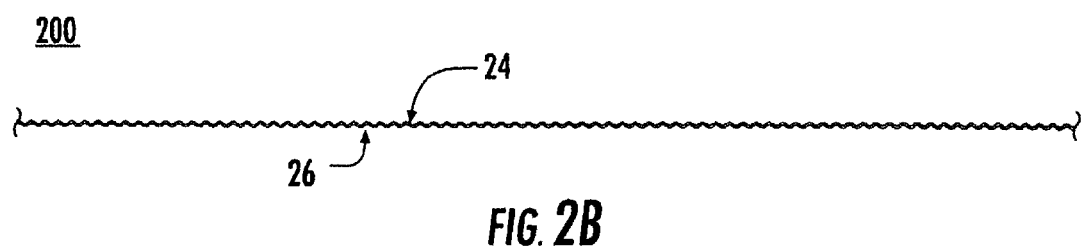
FIG. 2B illustrates the profile of the corrugated metallic foil adhesive tape of FIG. 2A.
Figure 3:
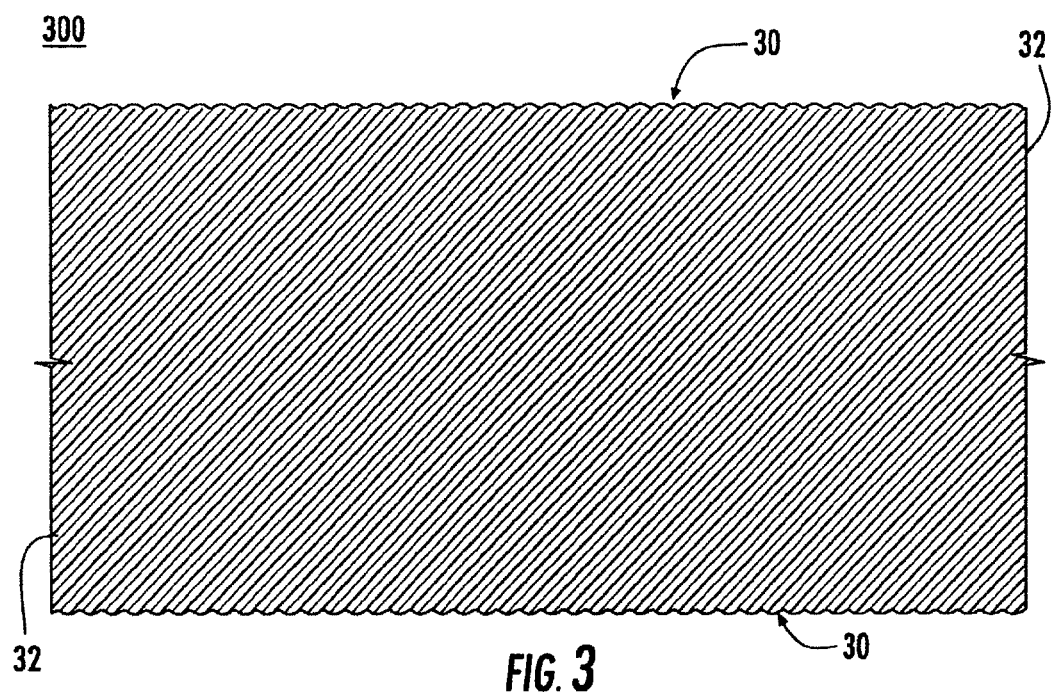
FIG. 3 illustrates corrugations at other than a ninety degree angle in a corrugated metallic foil adhesive tape in accordance with the present invention.

The metallic foil tape of the present invention is corrugated to have corrugations. The terms "corrugated" and "corrugations," as used herein, refer to regular indentations or markings including, but not limited to, folds, grooves, ridges, or furrows. Referring now to the figures, FIG. 1 illustrates a corrugated metallic foil tape 100 in accordance with the present invention. As illustrated in FIG. 2A, it is preferred that the corrugations are parallel to one another. FIG. 2B illustrates the profile of the corrugated metallic tape of FIG. 2A. The corrugations may be at a 90 degree angle as measured from the lengthwise edge(s) 20 of the corrugated metallic foil tape 200 as shown in FIG. 2A. Alternatively, the corrugations may be at an angle other than a 90 degree angle as measured from the lengthwise edge(s) 30 of the corrugated metallic foil tape 300 as shown in FIG. 3. FIG. 2A also illustrates the widthwise edge(s) 22 of the corrugated metallic foil tape 200 and FIG. 3 also illustrates the widthwise edge(s) 32 of the corrugated metallic foil tape 300.

Figure 4A:
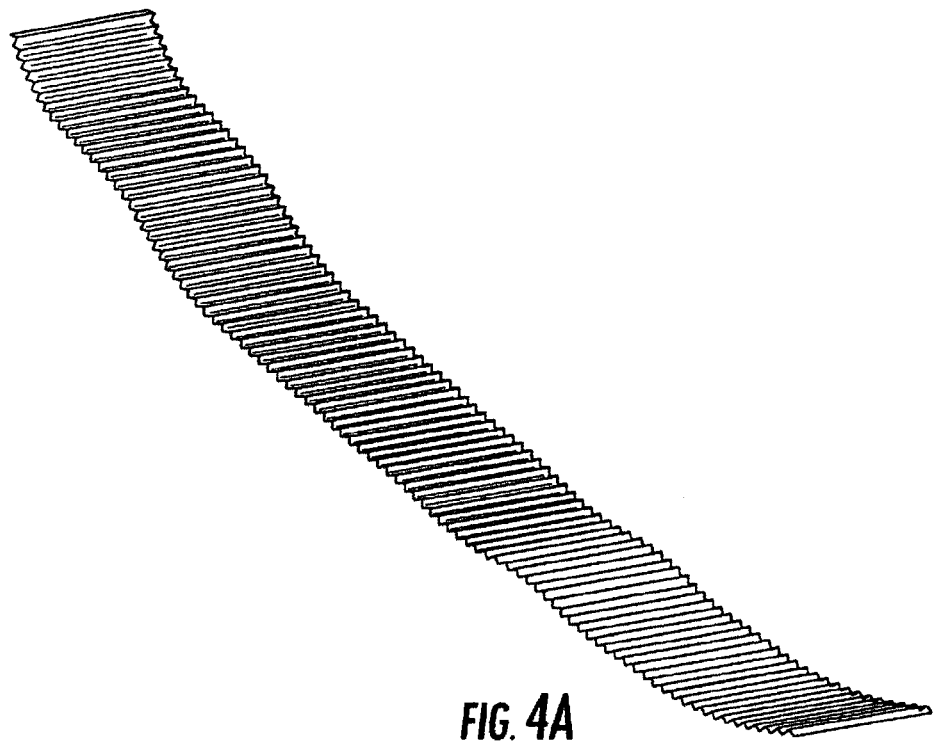
FIG. 4A is an illustrative drawing of another corrugated metallic foil adhesive tape in accordance with the present invention.
Figure 4B:
FIG. 4B illustrates the profile of the corrugated metallic foil adhesive tape of FIG. 4A.

As illustrated in FIGS. 2B and 4B, the corrugations in the tape may be of different shapes, sizes, and pitches. An advantage of the corrugated metallic foil tape of the present invention is that due to being corrugated, the tape is easier to conform without tearing, hence making the tape more durable, which is an improvement over the conventional flat metallic tapes that are being used in the industry. Commercially available flat metallic foil tapes may be obtained and subsequently corrugated in accordance with the method of the present invention. Examples of flat metallic foil tapes that are suitable for use in accordance with the present invention include, but are not limited to, Ideal IS 2000, Ideal 587A, Ideal 490, Nashua 324, Polyken 339, Fasson 0810, Fasson 0800, Venture 1581A, Compac 340, 3M-Scotch 3326, Shurtape AF 100, Venture 1581A, Ideal Seal 2000, Ideal Seal-587A/B, Fasson 0810, Covalence, Nashua 324A.

The metallic foil tape typically has a thickness in the range of from about ½ mil to about 5 mil, preferably about 2 mil in thickness. An example of a metallic foil tape suitable for use in the present invention is an aluminum foil tape.

Prior to being corrugated, a flat metallic foil tape may be directly coated with an adhesive then laminated to a release liner or indirectly coated with an adhesive by laminating the foil to a release liner with adhesive on it. The adhesive is generally applied to the flat metallic foil tape before corrugation. As discussed above herein, the corrugated metallic foil tape comprises a top surface and a bottom surface. Either the top surface or the bottom surface of the corrugated metallic foil tape comprises an adhesive coating.

Preferably, the adhesive is a high shear adhesive or an adhesive having holding power. For example, an adhesive that has good holding power would have the ability to withstand greater shear stress (i.e. forces applied parallel or tangential to a face of a material). ASTM D 3654 is a standard test method for Holding Power of Pressure Sensitive Tapes. A high shear adhesive is preferred over a low shear adhesive in HVAC unit applications because a high shear adhesive works at low temperature and high temperature conditions. Typically, a tape with a low shear adhesive has a tendency to tear or split under such conditions.

Preferably, the high shear adhesive is a pressure sensitive adhesive (PSA). The term "pressure sensitive adhesive," as used herein refers to, a material which in dry form is generally aggressively and permanently tacky at room temperature and firmly adheres to a variety of dissimilar surfaces upon mere contact without the need of more than typically finger or hand pressure. A pressure sensitive adhesive typically does not require activation by solvents or heat and adheres firmly to a wide variety of surfaces.

The pressure sensitive adhesive may be solvent based, water based, or in 100% solid form. Suitable types of pressure sensitive adhesives include, but are not limited to, acrylic, butyl rubber, natural rubber, polyurethane, styrene-butadiene rubber (SBR), synthetic isoprene rubber, ethylene vinyl acetate copolymers, and silicones.

The adhesive is applied to form a coating having a thickness of about 0.1 mil to about 5 mil, preferably about 1.5 to 2.5 mils. The adhesive coating is applied by any means known to one of ordinary skill in the art including, but not limited to, reverse roll, knife over roll, and extrusion coating onto a release liner which can be based on paper, clay, coated paper, glassine, film or any other material known in the art, then laminated to foil.

Referring to the figures, FIGS. 2B and 4B illustrate a corrugated metallic foil tape in accordance with the present invention having different cross-sectional views. FIG. 2B, for example, illustrates that the corrugated metallic foil tape has a top surface 24 and a bottom surface 26. As shown in FIG. 2A, the corrugated metallic foil tape 200 also has opposing edges both lengthwise 20 and widthwise 22. Each of these figures illustrate the corrugations in the tape may be of different shapes, sizes, and pitches.

The present invention also provides a method of making a corrugated metallic foil tape. The method comprises obtaining a flat metallic foil tape, and corrugating the flat metallic foil tape. The metallic tape is corrugated either manually or automatically to make regular indentations or markings in the tape. For example, one such method of corrugating the tape is a press with roller bars through which the uncorrugated tape is run, wherein the roller bars have demarcations or raised portions on the surfaces of the roller bars such that when the tape is fed between the roller bars, corrugations are made in the metallic tape. Manual or automated means are used to run the tape through the rollers. Alternatively, presses or other mechanical devices or equipment may be used to apply pressure to the tape as it is corrugated.

Figure 5:
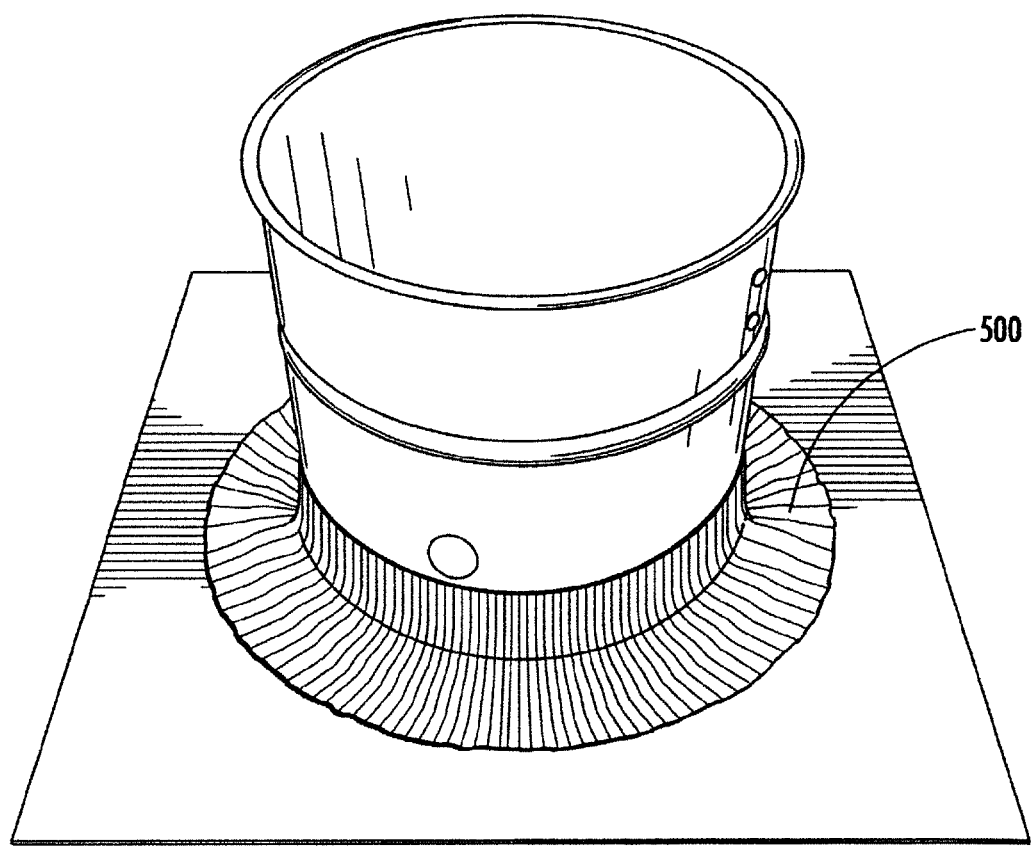
FIG. 5 is an illustration of a single continuous piece of corrugated metallic foil tape in accordance with the present invention applied in a circular or semi-circular shape to the vent of an air duct.

As discussed previously herein, there has been a growing need to solve the problems associated with energy loss, particularly in HVAC units. Among the numerous advantages associated with the corrugated metallic foil tape of the present invention is that it is able to conform to and against curved and three-dimensional surfaces without tearing and without destroying the integrity of the tape. FIG. 5 illustrates the corrugated metallic foil tape 500 of the present invention applied in a circular or semi-circular shape to an HVAC unit. The corrugated metallic foil tape of the present invention offers improved performance over conventional foil tapes as shown below in the examples where, particularly in these HVAC applications, a more durable, easily removable, and more efficient alternative is desired.

In the present invention, the tape is particularly suitable to be applied in a circular shape or into semi-circular segments or shapes. By having been corrugated, the metallic foil tape is easier to conform to a contoured, angled, or three-dimensional surface. By being corrugated, the metallic foil tape can be extended outward to form a smaller inside diameter and a larger outside diameter. There can be different angles and different shapes to the corrugations. The pitch can also be adjusted.

For example, as shown in FIG. 5, the corrugated metallic foil tape 500 of the present invention mates with the exterior dimensions of the collar flange of the plenum. The corrugated metallic foil tape 500 expands and stretches such that it conforms and is flush to the contoured, angled, or three-dimensional surface of the HVAC unit.

Figure 10:
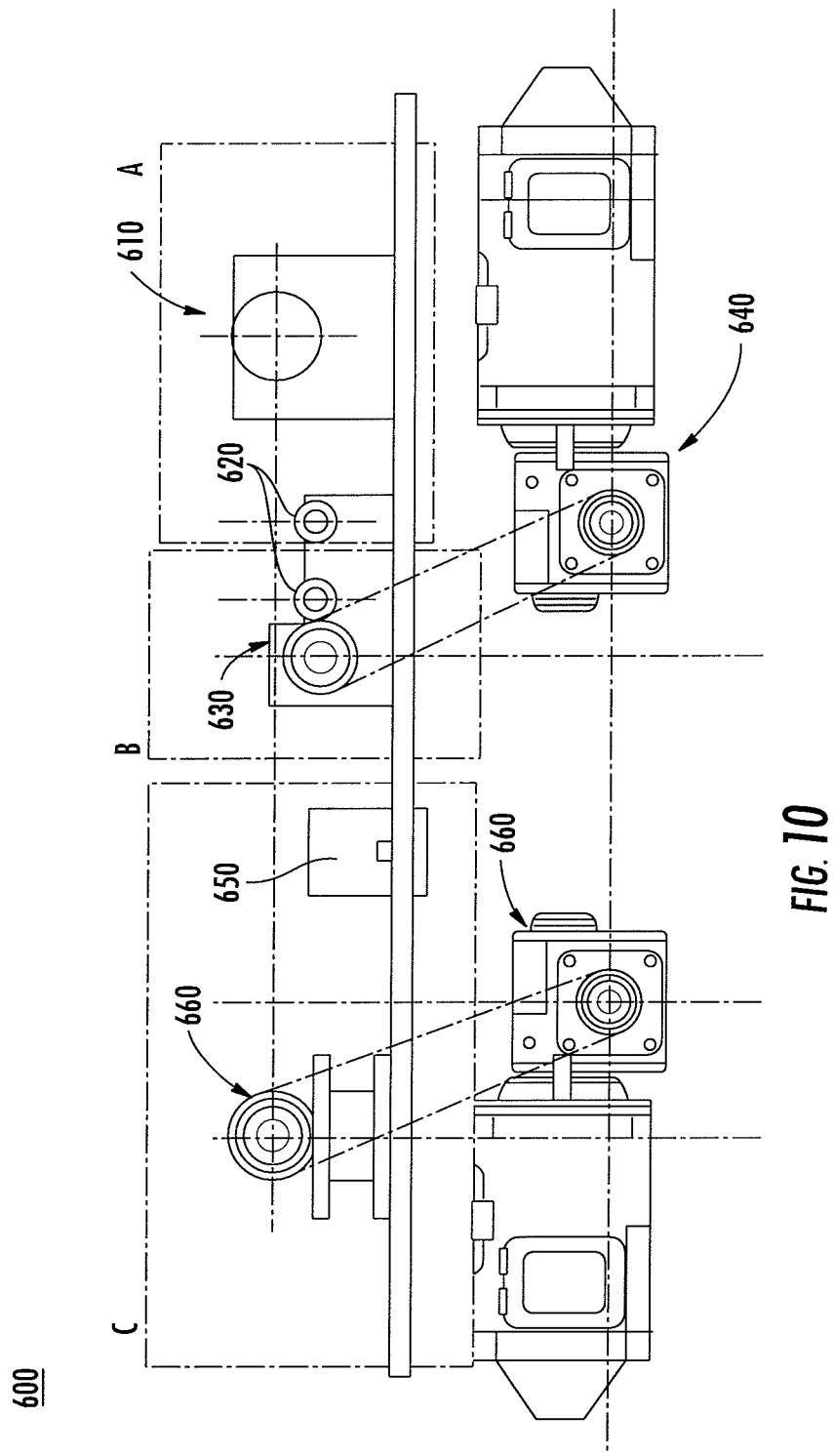
FIG. 10 is a side profile view of the overall corrugator system in accordance with aspects of the present invention.

In another aspect of the present invention, a corrugator system is provided for corrugating the corrugated metallic foil tape. Referring to the figures, an automated corrugator system 600 is illustrated in FIGS. 10-12. FIG. 10 is a side profile view of the overall corrugator system 600 of the present invention. FIG. 11 is a top view of certain of the components in the corrugator system 600 of the present invention. FIG. 12 is a side view of the components of FIG. 11.

As shown in FIGS. 10-12, the corrugator system 600 generally comprises at least three sections: an unwind section A, a forming head section B, and a rewind section C (also referred to as a wind-up section). In another aspect of the invention, the corrugator system 600 further comprises a control panel section (not shown). The control panel section comprises a control panel to provide for changing of operational aspects of the corrugator system such as adjustments in speed, differential unwind-forming-rewind, finished length and other parameters. Through controls and speed feedback, the exact length of the corrugated metallic tape to be produced is able to be provided.

As shown in FIG. 10, the unwind section A comprises a tape input feed mechanism 610 and alignment roller(s) 620. The tape input feed mechanism 610 feeds a flat metallic foil tape. Two alignment rollers 620 are present to ensure the alignment of the tape into the forming head section B and to keep the tape at a right angle to the gears of the corrugator device. Preferably, the alignment rollers are made of or coated with a non-stick material such as Teflon® material from E. I. DuPont de Nemours. The coated alignment rolls are for the purposes of properly forming the tape product, rewinding and packaging the product. The unwind section A may further comprise a slip clutch brake (not shown). The slip clutch brake is used to maintain a minimum tension through the forming head in order to fully form the corrugations and align the tape but not allow the tape to stretch.

Figure 13:
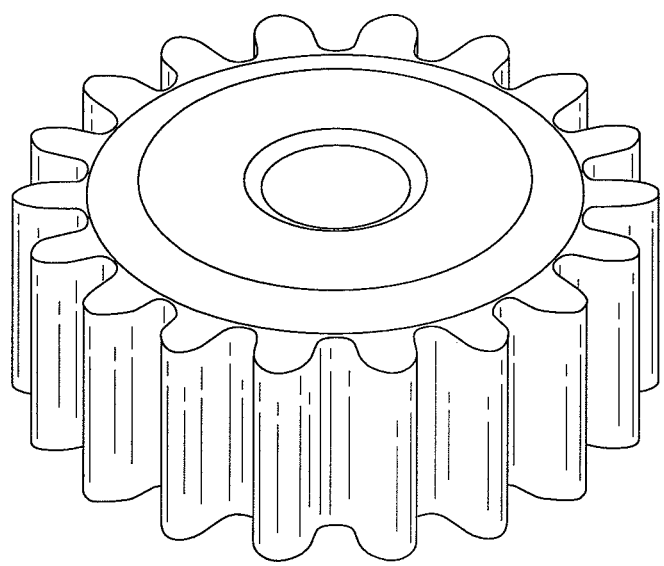
FIG. 13 is a perspective view of a gear suitable for use in accordance with aspects of the present invention.
Figure 14A:
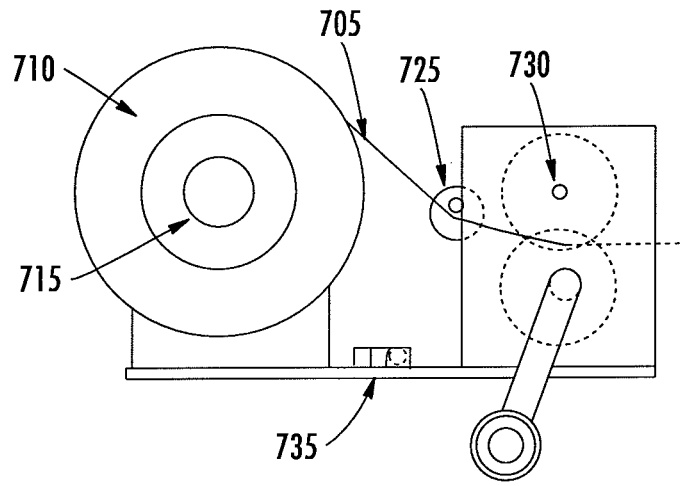
FIGS. 14A-D illustrate a hand-held corrugator device in accordance with aspects of the present invention.
Figure 14B:
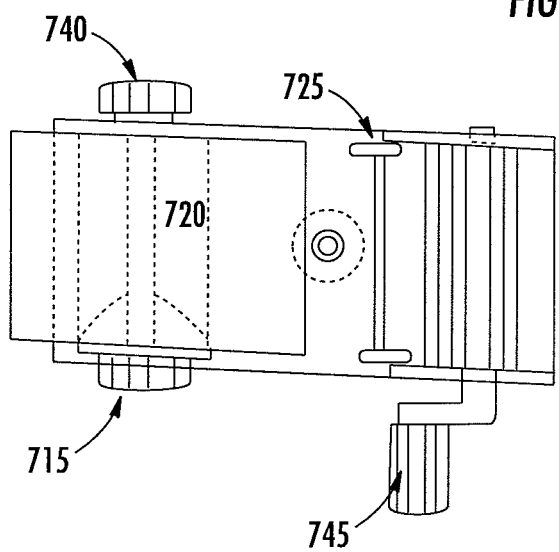
Figure 14C:
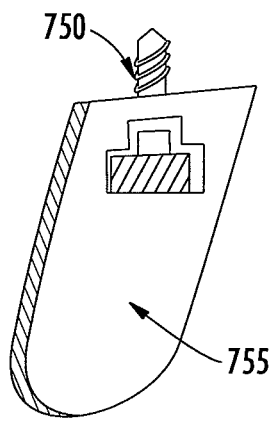
Figure 14D:
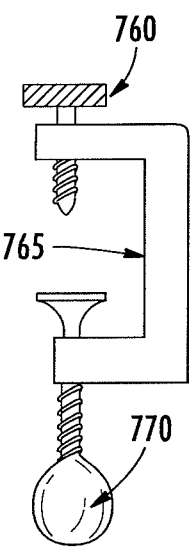

As shown in FIG. 10, the forming head section B comprises a drive motor 640 and a corrugator device 630 comprised of two or more gears. The corrugator device 630 forms corrugations in the tape. Examples of types of gears for use in the system of the present invention include, but are not limited to, spur, worm, helical and bevel. In a preferred aspect of the present invention, the forming head section B is comprised of two spur gears made of an non-abrasive material having the shape as shown in FIG. 13 to create the corrugations. The top gear is made adjustable in a height to vary the amount of corrugation and to vary the thickness of the product without damaging the product. The gears are changeable to vary the size and profile of the corrugations. Suitable gears include, but are not limited to, gears having 10 to 30 teeth per gear. An example of such a spur gear has a 1" pitch diameter and 24 teeth, brass.

As shown in FIGS. 10-12, the rewind section C comprises a slack sensor 650 a wind-up mandrel 660 and a wind-up drive motor 670 to drive the wind-up mandrel 660. The wind-up mandrel 660 is used to wind-up the formed tape. The rewind section C of the corrugator system 600 eliminates tension in the corrugated metallic tape after exiting the forming head section B so as to avoid pulling out the corrugations from the corrugated metallic tape. The rewind section C comprises a distance sensor 650 (also referred to herein as a slack sensor) to maintain slack in the formed tape to prevent corrugations from being pulled out. An example of a suitable type of distance sensor 650 includes, but is not limited to, an ultrasonic type. Using a separate motor 670 at the rewind section C and at the forming head section B, it is possible to vary the speed of the wind-up mandrel 660 to maintain the desired slack amount. Using the control panel, for example, a starting speed ratio is selected for the wind-up mandrel 660 that is varied depending upon the position and size of the gears in relation to the thickness of the tape product. This permits one to start the corrugator device 630 before the slack sensor 650 takes control of the speed of the wind-up mandrel 660 by controlling the variation in the speed. It is preferred that the speed of the first drive motor to the speed of the second drive motor is in a speed ratio in a range of 1 to 4.5. In accordance with aspects of the present invention, it is advisable for the rewind mandrel to begin at a speed relatively close to the required speed for a given tape product in order to avoid any stretching of the product or excessive slack.

There are features within the corrugator system that provide for frequency expansion and frequency compression. With regard to frequency expansion, there is an option to have a controlled, post-form elongation of the corrugations. For example, in one system setting, there is a 20% consumption of tape material in forming of the corrugations (i.e. 1.2 inches required for formation of 1.0 inches). After forming, the controls of the system are set to allow the system to accurately pull or elongate the tape material (overdriving the wind-up roll) to move from 1.2 to 1.05. This allows material to be adjusted for specific uses, and maximizes material effectiveness. With regard to frequency compression, there is an option to allow the gear set to "over-driven" compared to the wind-up roll drive. This in effect causes a compression of the corrugations.

There are also features within the corrugator system that provide for amplitude adjustment. The corrugator device is able to adjust the meshing of the gears to increase or decrease the corrugation thickness or amplitude. The two shaped gears impart the shape to the substrate material which is the tape. The gears are adjustable depending upon more or less engagement for the foundational magnitude or amplitude of the corrugation. The foundational amplitude refers to the overall distance from the top of the corrugation to the bottom or thickness. The corrugator system is designed for quick change of the gears so that the gears are easily changeable to modify the amplitude, frequency, and shape of the corrugations. This is a feature that makes the corrugator system suitable for numerous types and ranges of applications.

In HVAC applications, there are desired parameters in the corrugation system of the present invention in order to make a corrugated metallic foil tape for use in HVAC applications in accordance with aspects of the present invention. For example, the amplitude of corrugations in a corrugated metallic foil tape for use in a HVAC application is in a range of about 0.34 to 0.25 inches, preferably about 0.34 to 0.120 inches. The corrugated metallic foil tape has a frequency of corrugations per inch in a range of about 4 to 8. Also, for making a corrugated metallic foil tape for use in a HVAC application, the length ratio of corrugated tape to flat tape is in a range of about 1:1.1 to 1:4.0, preferably about 1:1.1 to 1:1.3.

The corrugator system is adjustable or scaleable up or down to fit any application or production level. It is within the scope of the present invention that the corrugator system is modified to be either a hand-held system or a removable tabletop system for use in certain applications. FIGS. 14A-D illustrates a hand-held corrugator device 700 in accordance with aspects of the present invention. As shown in FIG. 14, a tape path 705 is illustrated. A solid line illustrates tape that is fed from tape roll 710. A dashed line illustrates tape that has passed through forming gears 730. Tape roll 710 holds the tape to be corrugated. Attachment cap 715 holds the tape roll 710 in place on a retaining mechanism 720. The retaining mechanism 720 is a simple mechanism to hold the tape in a desired position with desired alignment. A shaft rotates through resistance adjustment 740. A tape guide 725 ensures that the tape passes through the forming gears 730 aligned and at the desired angle. Forming gears 730 are shaped to provide an optimum corrugation and shape to the tape. The forming gears 730 are engineered with a predetermined gap to ensure correct forming and no damage to the tape. Retaining nut 735 is welded to a base plate for attachment of the handle 750 and the gable mounting clamp 765. Resistance adjustment 740 utilizes a spring washer assembly to control the turning resistance of the tape retaining mechanism 720. Driving handle 745 is the handle to turn to rotate the forming gears 730 to form the corrugated tape. Handle attachment screw 750 is a screw that is turned into the retaining nut 735 to hold the handle to the bottom for hand operation. Hand operation handle 755 is a handle that is attachable to the bottom of a tabletop for hand operation. Table clamp attachment screw 760 is turned into the top of retaining nut 735 to hold the clamp in place. Table clamp assembly 765 is used to hold the corrugator device to a tabletop.

Figure 15:
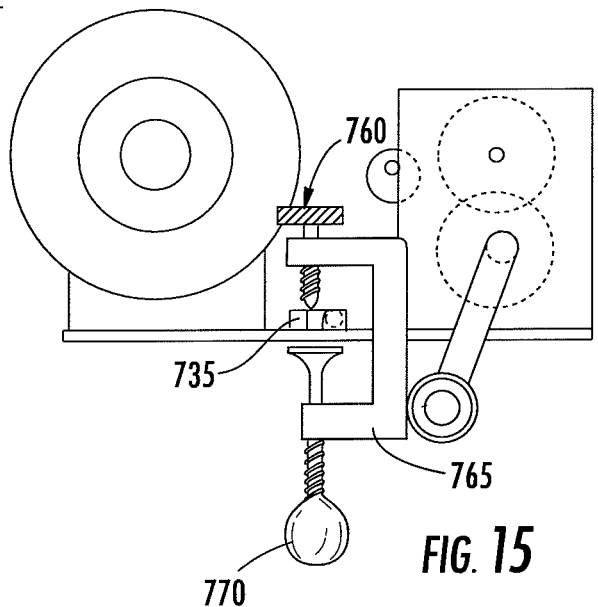
FIG. 15 illustrates the corrugator device of FIG. 14 mounted to a table top.

For certain projects, the corrugator device is optionally clamped to a tabletop to speed its operation. FIG. 15 illustrates the corrugator device 700 mounted to a table top. The table clamp assembly 765 is screwed into the retaining nut 735 using the table clamp attachment screw 760. The table clamp screw 770 is hand tightened to secure it to a table. A standard "C" type clamp is optionally used for the same purpose.

At times the hand held option is more advantageous. To facilitate this option, handle 755 is attached to the retaining nut 735 utilizing the handle attachment screw 750. It is understood that the corrugator device of the present invention is modifiable yet still within the scope of the present invention.

Figure 16:
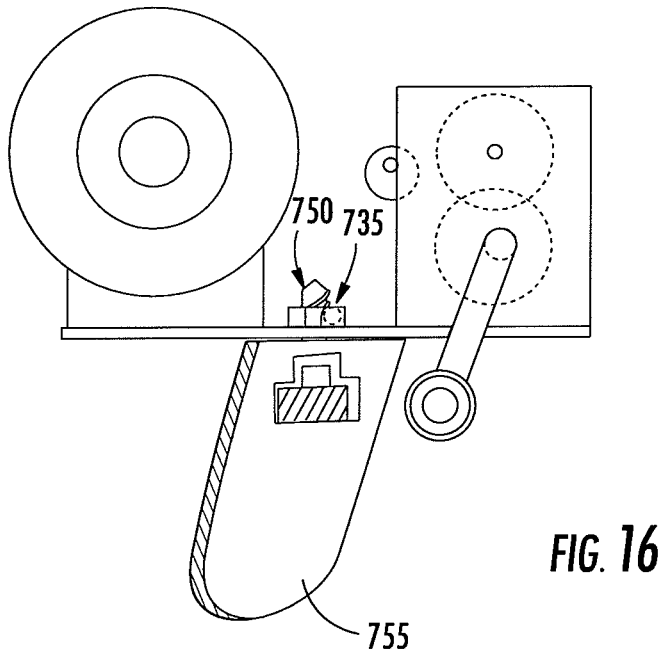
FIG. 16 illustrates another version of a hand-held device in accordance with aspects of the present invention.

FIG. 16 illustrates a hand-held version of corrugator device 700 in accordance with aspects of the present invention. Hand operation handle 755 is attached to retaining nut 735 utilizing the handle attachment screw 750.

Example

Metal Tapes

Figure 6:
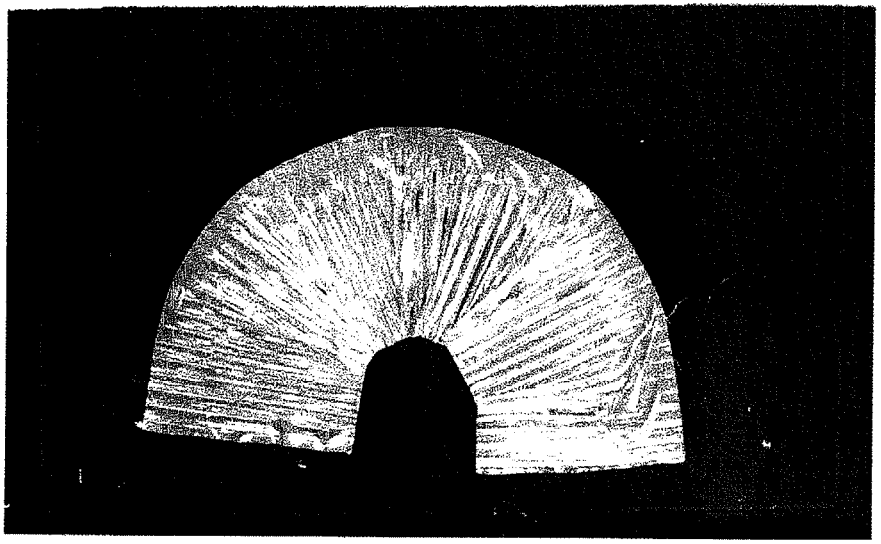
FIG. 6 is a photograph of a corrugated metallic foil tape in accordance with the present invention configured in a form of a semi-circle.

FIG. 6 is a photograph of a corrugated metallic foil tape in accordance with the present invention configured in a form of a semi-circular segment or shape.

Figure 7:
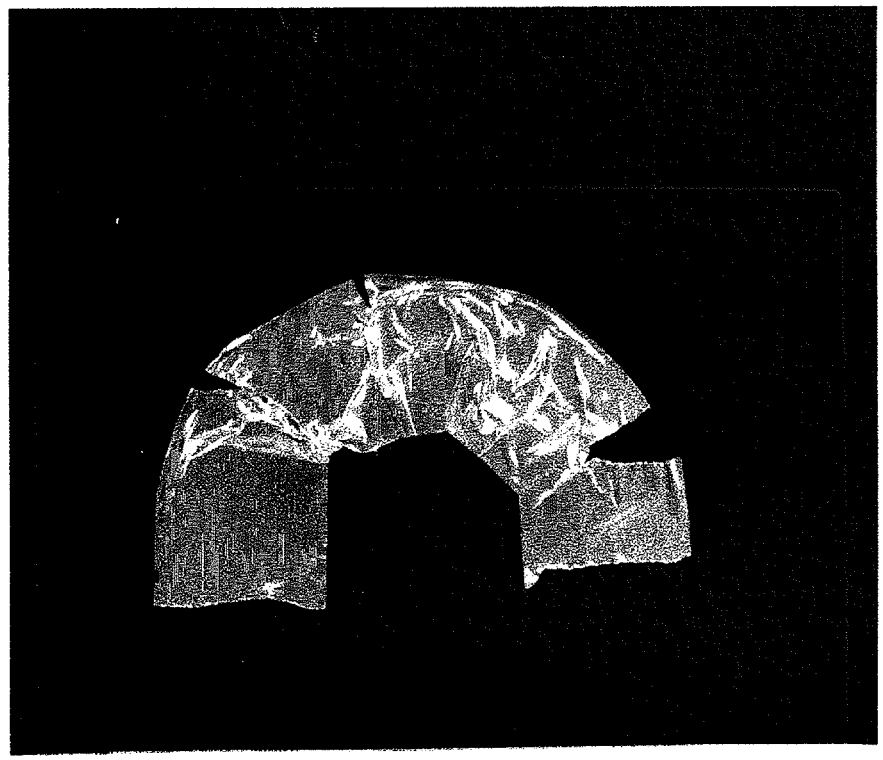
FIG. 7 is a photograph of a conventional foil tape configured in a form of an arc of a circle.

For comparative purposes, FIG. 7 is a photograph of a conventional foil tape configured in a form of an arc of a circle. It can be seen from FIG. 7 that the foil tape tears when trying to conform it in the shape of a circle.

Figure 8:
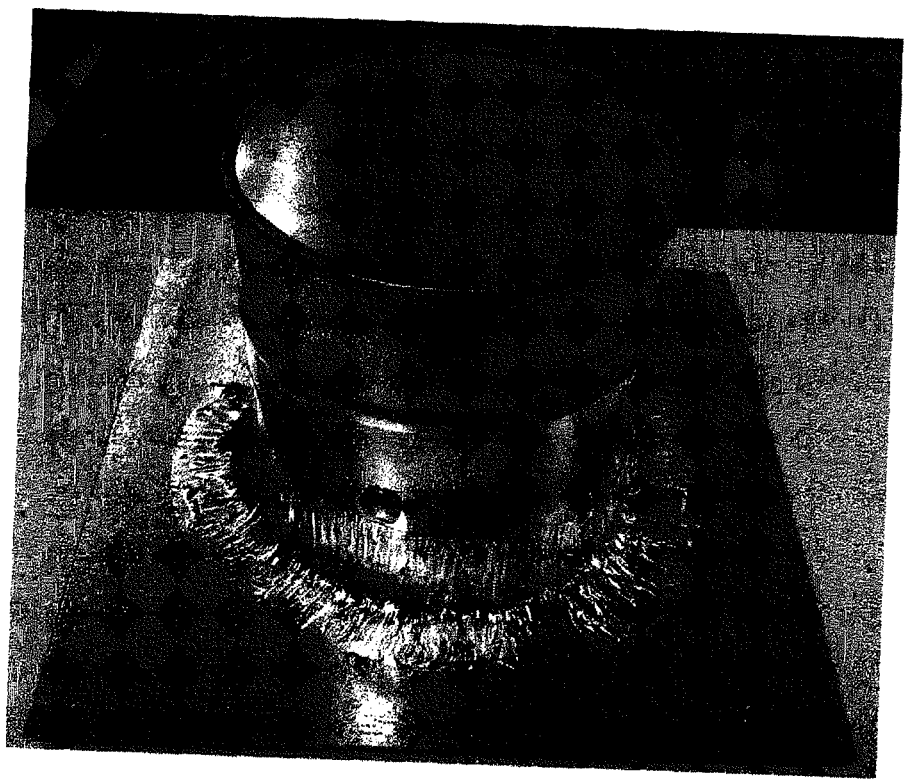
FIG. 8 is a photograph of a single continuous piece of corrugated metallic foil tape in accordance with the present invention applied in a circular or semi-circular shape to the vent of an air duct.

FIG. 8 is a photograph of a single continuous piece of corrugated metallic foil tape in accordance with the present invention applied around the circular vent of an air duct. The corrugated foil tape shown in FIG. 8 was applied in one continuous piece and had an installation time of two minutes and nine seconds.

Figure 9:
FIG. 9 is a photograph of pieces of conventional foil tape applied in a circular or semi-circular shape around the vent of an air duct.

For comparative purposes, FIG. 9 is a photograph of pieces of conventional foil tape applied around the circular vent of an air duct. The installation time for the standard foil tape shown in FIG. 9 required five pieces of tape, Shurtape AF 100, and had an installation time of three minutes and 54 seconds.

Example

Duct Tape

An experiment was conducted for the following tapes in accordance with ASTM E2342 and the results of the experiment are set forth in Table 1.

TABLE 1

| Tape (Tested to the requirements of ASTM E2342) | Time to Failure in Days (Minimum 60 days required by the test) |
|---|---|
| Duct Tape [Covalence Nashua 557, Covalence Nashua 558 CA, Shurtape PC 857, and Shurtape PC 858 CA] | 1-13 |
| Duct tape backing with acrylic adhesive | 1-35 |
| Corrugated foil tape with acrylic adhesive in accordance with the present invention (using Shurtape AF 100 aluminum foil tape prior to corrugation) | 69+ |

It will therefore be readily understood by those persons skilled in the art that the present invention is suitable for broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A hand-held corrugator device comprising:
    a tape roll for holding a metallic foil tape,
    at least two forming gears for corrugation of the metallic foil tape,
    a drive handle to rotate the forming gears, and
    an attachment to a tabletop.

2. The device according to claim 1, further comprising an attachment cap for holding the tape roll in place.

3. The device according to claim 1, further comprising a tape guide.

4. The device according to claim 1, wherein the forming gears are shaped.

5. The device according to claim 1, wherein the forming gears are spur, worm, helical, or bevel gears.

6. The device according to claim 1, wherein the forming gears have a predetermined gap between the forming gears.

7. The device according to claim 1, further comprising a hand operation handle for hand operation.

* * * * *